(12) United States Patent
Funaba et al.

(10) Patent No.: US 6,470,702 B2
(45) Date of Patent: *Oct. 29, 2002

(54) ABSORPTION WATER HEATER/CHILLER AND HIGH TEMPERATURE REGENERATOR THEREFOR

(75) Inventors: Yasushi Funaba, Tsuchiura; Norihiro Itou, Tokyo; Tomihisa Oouchi, Tsuchiura; Satoshi Miyake, Tsuchiura; Michiyuki Uchimura, Tsuchiura, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/814,713

(22) Filed: Mar. 23, 2001

(65) Prior Publication Data

US 2001/0020367 A1 Sep. 13, 2001

Related U.S. Application Data

(63) Continuation of application No. 09/508,992, filed on Mar. 20, 2000, now Pat. No. 6,301,925.

(30) Foreign Application Priority Data

Nov. 12, 1997 (JP) .............................................. 9-310124

(51) Int. Cl.$^7$ .............................................. F25B 33/00
(52) U.S. Cl. .......................................... 62/497; 62/476
(58) Field of Search ....................... 62/497, 476, 238.3; 165/66, 909, 132; 432/180; 122/18.3, 14.1, 14.2

(56) References Cited

U.S. PATENT DOCUMENTS 4,499,859 A * 2/1985 Nishiguchi et al. ........... 122/18
5,435,154 A * 7/1995 Nishiguchi et al. ........... 62/476
5,771,711 A * 6/1998 Kubota ........................ 62/497
5,862,679 A * 1/1999 Nakamura et al. ............ 62/497

FOREIGN PATENT DOCUMENTS

| | | |
|---|---|---|
| JP | 6-221718 | 8/1994 |
| JP | 7-22371 | 4/1995 |
| JP | 8-49802 | 2/1996 |
| JP | 8-193767 | 7/1996 |
| JP | 9-42800 | 2/1997 |
| JP | 9-257207 | 9/1997 |
| JP | 10-267205 | 10/1998 |
| WO | WO 99/24769 | 5/1999 |

* cited by examiner

Primary Examiner—Chen-wen Jiang
(74) Attorney, Agent, or Firm—Crowell & Moring LLP

(57) ABSTRACT

An absorption water heater/chiller using lithium bromide as an absorbent and water as a refrigerant, and a high temperature regenerator therefor. The high temperature regenerator is provided with a combustion chamber defined by an inner tube (2) on the side of a blowout port of a burner (4B), from which a combustion gas is blown out. A solution is received in a liquid chamber, which extends on upper and lower sides of the combustion chamber and is defined by an outer tube (1). A refrigerant steam outflow passage (8) is formed in an upper portion of the outer tube, and gas discharge passages (13, 14) are formed at an end portion of the combustion chamber opposed to the burner. A plurality of solution tubes (3) providing communication between the liquid chamber portions on the upper and lower sides of the combustion chamber extend through the combustion chamber. The plurality of solution tubes are roughly divided into a group (3A) provided in flame of the burner, and a group (3B) provided away from the flame of the burner. The two groups are spaced from each other by 10–100 mm. Thus reduction of Nox is achieved and generation of CO is suppressed.

13 Claims, 15 Drawing Sheets

ABSORPTION WATER HEATER/CHILLER AND HIGH TEMPERATURE REGENERATOR THEREFOR

This application is a Continuation of application Ser. No. 09/508,992 filed Mar. 20, 2000 now U.S. Pat. No. 6,301,925.

TECHNICAL FIELD

The invention relates to an absorption water cooing and heating apparatus and a high temperature regenerator therefor, and more particularly to an absorption water cooling and heating apparatus, in which lithium bromide is used for an absorbent and water is used for a refrigerant, and a high temperature regenerator therefor.

BACKGROUND TECHNIQUE

With a conventional absorption water heater/chiller, for example, as shown in Japanese Patent Unexamined Publication No. 8-193767, a liquid chamber serving as a liquid reservoir for storing an absorption solution is formed in upper and lower portions of a combustion chamber, through which a combustion gas generated in a burner of a high temperature regenerator flows, and a plurality of solution tubes for communication between the upper liquid chamber and the lower liquid chamber are provided to extend through the combustion chamber. These solution tubes can be largely classified into two groups.

One of the groups provides a tube group which is positioned near the burner and against which flame strikes, and the other of the groups provides a tube group positioned apart from the burner. A space where the solution tubes do not stand close together is defined between the two groups. Then, flame issuing from the burner is caused to strike against the group of liquid tubes, which are positioned near the burner, to decrease in temperature. Thus, reduction of nitrogen oxide (NOx) generated in the high temperature regenerator is achieved.

Hereupon, with the high temperature regenerator of the absorption water heater/chiller described in Japanese Patent Unexamined Publication No. 8-193767, the solution tubes are circular in cross sectional shape, so that liquid and vapor flow only in one direction from a lower side to an upper side. That is, a one-dimensional flow, in which a boiled rising flow goes throughout the entire tubes, is only generated.

When combustion is effected with the flame of the burner near the group of solution tubes, which stand close together in the combustion chamber, the combustion gas is high in temperature at those regions of the solution tubes, with which flame contacts, to provide a high heat flux. In the case where a circular tube is used for the solution tubes, an increase in heat flux leads to an increase in amount of vapor generated in the tubes to cause an increased flow resistance. As a result, the solution circulating in the solution tubes is reduced amount, and the solution becomes locally high in concentration. An experimental study carried out by the inventors of the present application has revealed that corrosive deterioration is generated in those portions of the solution tubes, in which the solution becomes locally high in concentration. Accordingly, it is not possible to use an inexpensive material, and so use of an extremely expensive high temperature regenerator is unavoidable.

Further, in Japanese Patent Unexamined Publication No. 9-42800 discloses an absorption water heater/chiller, in which forced convection is generated by passing a dilute solution, supplied from a solution pump, through a group of heat transfer tubes having a high heat flux and disposed near the burner. However, when partially loaded, the absorption water heater/chiller is operated with an amount of circulating solution throttled in the high temperature regenerator, thus causing a disadvantageous that partial load operation cannot be effected in the construction described in the above publication, in which forced convection applies for the high temperature regenerator.

Further, Japanese Patent Unexamined Publication No. 8-49802 discloses a high temperature regenerator for an absorption water cooing and heating apparatus, in which Karman's vortices are generated with a relationship $P \geqq 2D$ where P indicates a pitch of a group of liquid tubes in a fuel or air flow direction and D indicates a diameter D of the liquid tubes, and mixing of flame is promoted by the Karman's vortices. With the construction described in the above publication, the Karman's vortices are generated to cause mixing of unburned gases which makes the combustion gas uniform in temperature. However, since the combustion gas decreases uniformly in temperature, CO is reduced in a rate of oxidation reaction. Hereupon, to eliminate CO through oxidization, there is caused a need of providing a space which is useful for oxidization of CO but not for heat transfer, in a downstream side of the group of liquid tubes.

The invention has been made in view of the disadvantage of the prior art described above, and an object of the invention is to achieve both of reduction of thermal NOx and restriction of CO generation in an absorption water heater/chiller. Another object of the invention is to make an absorption water heater/chiller and a high temperature regenerator therefor compact. A further object of the invention is to realize an inexpensive and long-life absorption water heater/chiller and a high temperature regenerator therefor. Still further object of the invention is to realize an absorption water heater/chiller capable of stably operating even under a partly loaded condition, and a high temperature regenerator therefor.

DISCLOSURE OF THE INVENTION

The invention provides an absorption water heater/chiller comprising a high temperature regenerator and a low temperature regenerator for heating an absorption solution, which is generated by having an absorbent absorbing a refrigerant, and for evaporating the refrigerant to concentrate the absorption solution; a condenser for condensing a refrigerant vapor generated in the low temperature regenerator at the time of cooling; an evaporator mounting therein a heat transfer tube for circulation of a heating medium and for exchanging heat between a liquid refrigerant generated in said condenser or a vapor refrigerant generated in said high temperature regenerator and with the heating medium in said heat transfer tube; and an absorber communicated with the evaporator and for having the absorption solution, which has concentrated in said high temperature regenerator and said low temperature regenerator, absorbing the refrigerant vapor introduced from said evaporator, and wherein said high temperature regenerator comprises an inner cylinder, an outer cylinder, which covers said inner cylinder, and combustion means mounted to said outer cylinder and for burning a combustible gas in said inner cylinder, and wherein a plurality of first flat tubes, which are lengthy in a flow direction of a combustion gas, are provided near the combustion means, and a plurality of second flat tubes, which are lengthy in the flow direction of the combustion gas, are provided in a downstream side of the first flat tubes in the flow direction of the combustion gas, fins being formed on outer surfaces of said second flat tubes.

More desirably, fins are formed partly on flat portions of the second flat tubes; a combustion space for the combustion gas is defined between the first flat tubes and the second flat tubes; a distance between the combustion means and the plurality of first flat tubes is 10 to 100 mm; portions for receiving the absorption solution are formed on upper and lower portions of the inner cylinder between the inner cylinder and the outer cylinder, and the first flat tubes and the second flat tubes are communicated with the receiving portions; and the plurality of first flat tubes are arranged in two rows in the flow direction of the combustion gas.

According to the invention, a high temperature regenerator for absorption water heaters/chillers comprises an inner cylinder; an outer cylinder which covers the inner cylinder; liquid chambers formed between the outer cylinder and the inner cylinder in upper and lower portions of the inner cylinder and for holding a solution; a burner mounted to said outer cylinder and for burning a combustible gas in said inner cylinder; and a plurality of first solution tubes arranged in said inner cylinder to be communicated with said upper liquid chamber; and wherein the burner has a flame hole plate toward the inner cylinder surface, and a distance between the flame hole plate and the first solution tubes is set to 10 mm to 100 mm.

More desirably, a plurality of second solution tubes are arranged downstream of the first solution tubes to be communicated with the upper liquid chamber, and the first solution tubes are flat tubes, which are flat in a direction of flame from the burner; the first solution tubes are constructed such that temperature boundary layers are formed to extend from the upstream side to the downstream side along the flow direction of the combustion gas; the first solution tubes are communicated with said lower liquid chamber; the second solution tubes are communicated with the lower liquid chamber; a plurality of fins are formed on outer surfaces of the second solution tubes; and the second solution tubes are a flat tube which is lengthy in the flow direction of the combustion gas.

BEST MODE FOR CARRYING OUT THE INVENTION

Figure 9:
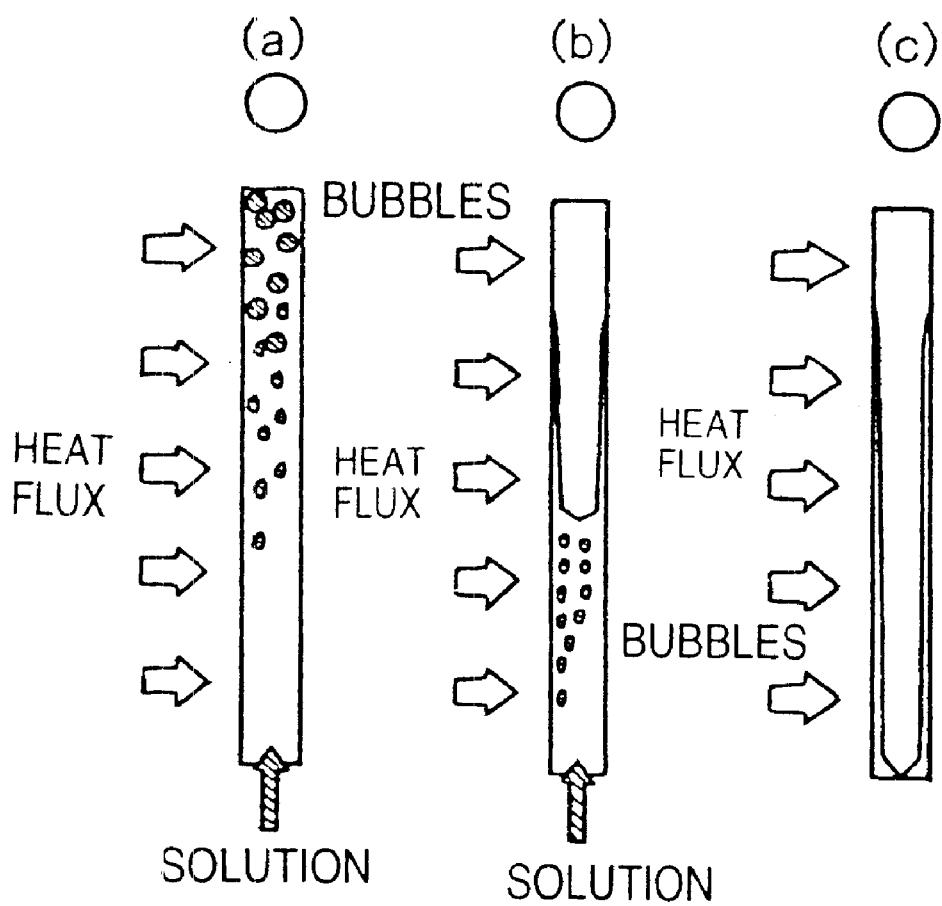
FIG. 9 is a view illustrating a flow of a solution in a tube having a circular cross section in the high temperature regenerator.
Figure 10:
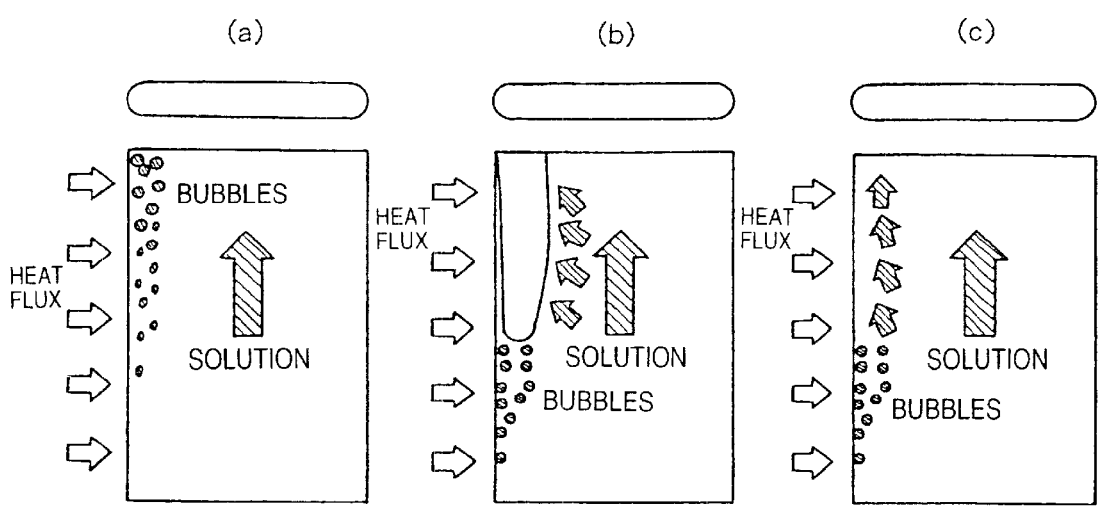
FIG. 10 is a view illustrating a flow of a solution in a tube having a flattened cross section.
Figure 11:
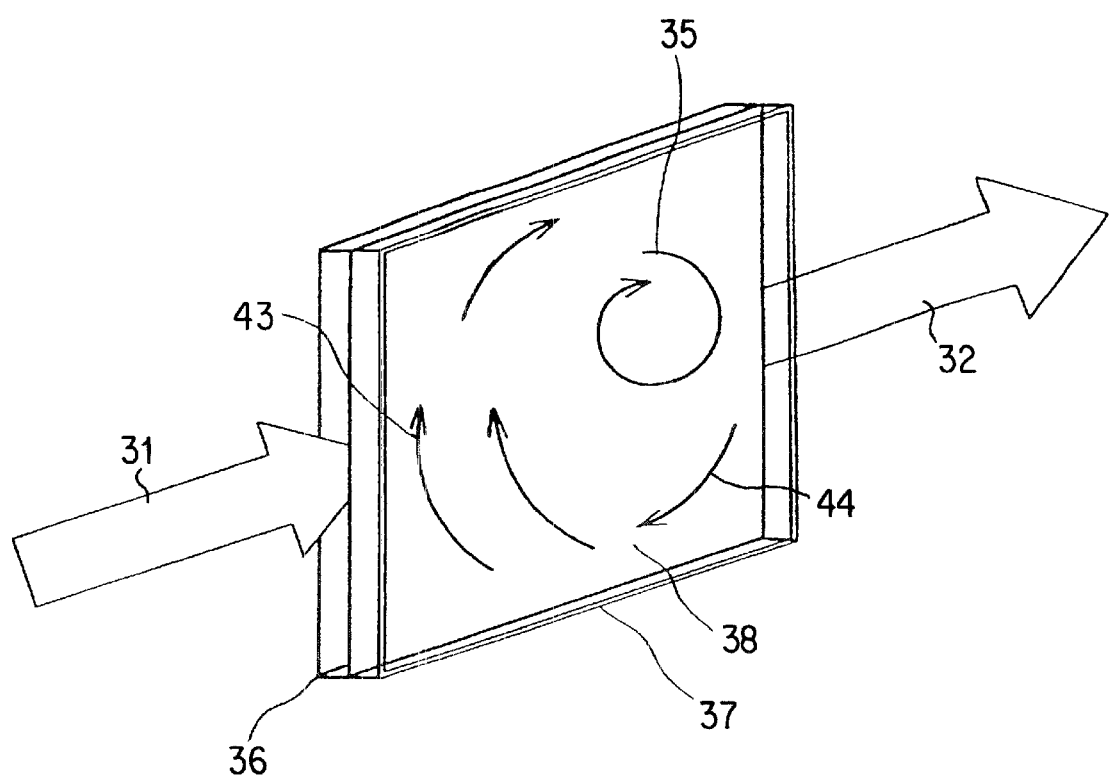
FIG. 11 is a view illustrating a flow of a solution in a group of flat tubes.

At first, the principle of the invention will be described with reference to FIGS. 9 to 14. FIG. 9 is a view illustrating a flow of a solution in a solution tube having a circular cross section in the high temperature regenerator, FIG. 10 is a view illustrating a flow of a solution in a solution tube having a flattened cross section in the high temperature regenerator, and FIG. 11 is a view illustrating a solution flow on the basis of a visible experiment in a group of the flat tube. In FIGS. 9 and 10, a thick arrow in a horizontal direction indicates a heat flux and a hatched arrow indicates a solution flow.

FIG. 9 shows a state of boiling in the case where a solution tube is circular in cross section. Heat flux generated when a burner heats the solution tube causes a solution in the solution tube to generate bubbles to start boiling as shown in FIG. 9(a). In the case where the solution tube is circular in cross section, a flow of the solution is formed only in a vertical direction to make a one-dimensional flow. When heat applied to the solution tube having the circular cross section increases and heat flux generated becomes too high, an amount of vapor generated increases and the solution becomes high in concentration as shown in FIG. 9(b). Finally, as shown in FIG. 9(c), the solution causes crystallization, leading to an empty burning state and corrosion of a heat transfer surface.

FIG. 10 is a view corresponding to FIG. 9, and shows a case where the solution tube is flat in cross section. Heat applied by a gas burner causes the solution in the solution tube to start boiling as shown in FIG. 10(a). In FIG. 10, being flat in cross section, the solution tube causes a flow of the solution to be formed in upper, lower, right and left portions to make a two-dimensional flow. When heat applied to the solution tube increases and the resulting heat flux becomes too high, an amount of vapor generated increases and the solution becomes high in concentration as shown in FIG. 10(b). In FIG. 10, the solution tube being a flat tube, a flow of solution is generated from right and left portions, as shown in FIG. 10(c), in a direction, in the solution decreases in concentration even when the solution comes into an empty burning state. Accordingly, it is possible to prevent the solution from being crystallized and the heat transfer surface from being corroded. Further, being two-dimensional, the flow is made favorable in flowability.

FIG. 11 shows the result of observing an experiment. in which a flow of the solution in the group of flat tubes is simulated. A glass plate 37 is mounted on a surface of a heat transfer tube 36 and a combustion gas heats a heat transfer surface 38. A flow of the solution is shown by an arrow of solid line. Since heat flux on the heating surface is adjusted to be high in an inflow side 31 of the combustion gas and to be low in an outflow side 32 of the combustion gas, an amount of vapor generated is more in the inflow side of the combustion gas than in the outflow side. As a result, the solution filled in the group of flat tubes makes a boiled rising flow 43 in the inflow side of the combustion gas and makes a descending flow 44 in the outflow side of the combustion gas, thus forming a spiral flow 35 as shown in the drawing. Accordingly, it is possible to prevent the solution from stagnating, increase a speed of the rising flow in the high heat flux region, and to improve a transfer rate of boiling heat in the inflow portion of the combustion gas, whereby an improved liquid circulation is formed in the entire group of flat tubes. Conventionally, the solution tube is circular in cross section to generate the flow of the solution shown in FIG. 9. In contrast, with the invention, the solution tube is flat in cross section to generate the flow of the solution shown in FIGS. 10 and 11.

Figure 12:
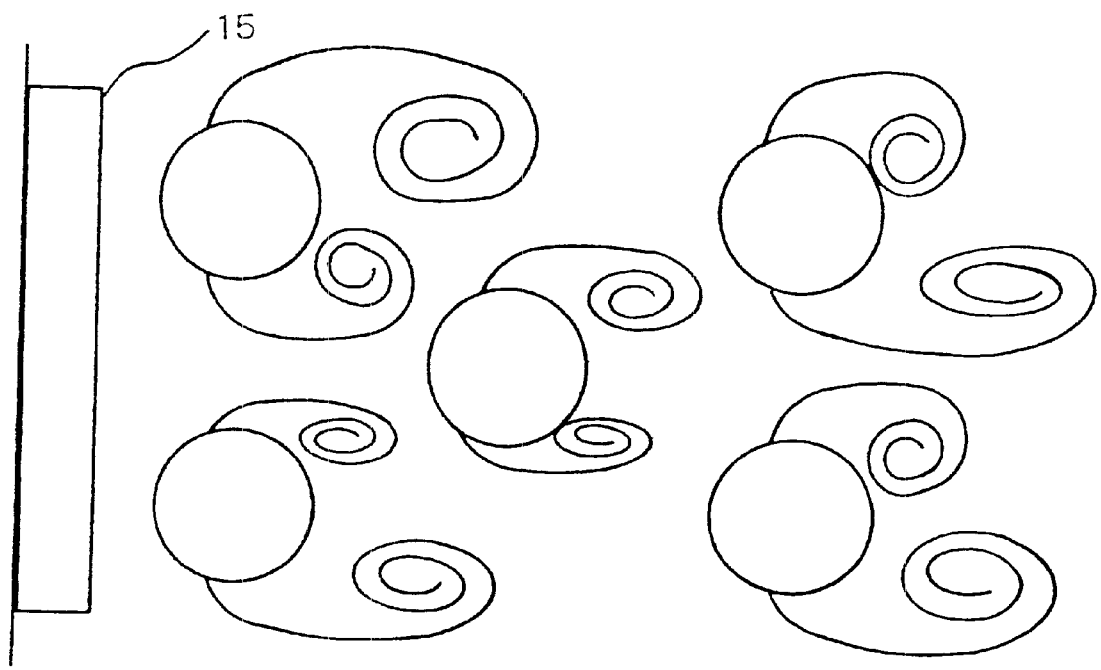
FIG. 12 is a view illustrating combustion around a tube having a circular cross section.

The flow in the solution tube heated by the combustion gas has been described above. The combustion gas is different in a state of combustion from the conventional one since the group of the solution tubes are arranged in flame produced by the gas burner. The principle for this will be described with reference to FIGS. 12 to 14. FIG. 12 is a view illustrating a method of reducing CO by generating the Karman's vortices, FIG. 13 is a view illustrating a behavior of the combustion gas when the flat tubes are arranged in the combustion chamber, and FIG. 14 shows the result of an experiment when the flat tubes shown in FIG. 13 are used.

When a conventional tube having a circular cross section is used for the solution tube, Karman's vortices generate, as shown in FIG. 12, to cause mixing of the unburned gas which makes a temperature of the combustion gas uniform. Since the combustion gas decreases uniformly in temperature, however, an oxidizing reaction speed of CO is reduced to suppress generation of CO, which requires a large combustion space in the downstream side, as mentioned above. The flat tube shown in FIG. 13 is used to solve such disadvantage.

Figure 13:
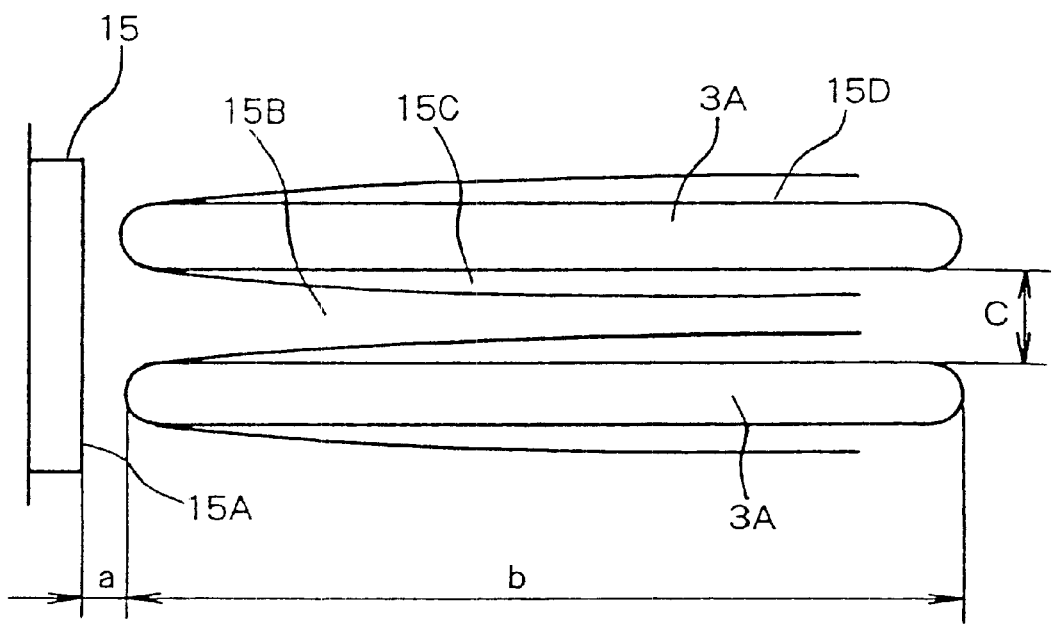
FIG. 13 is a view illustrating combustion around a tube having a flattened cross section.
Figure 14:
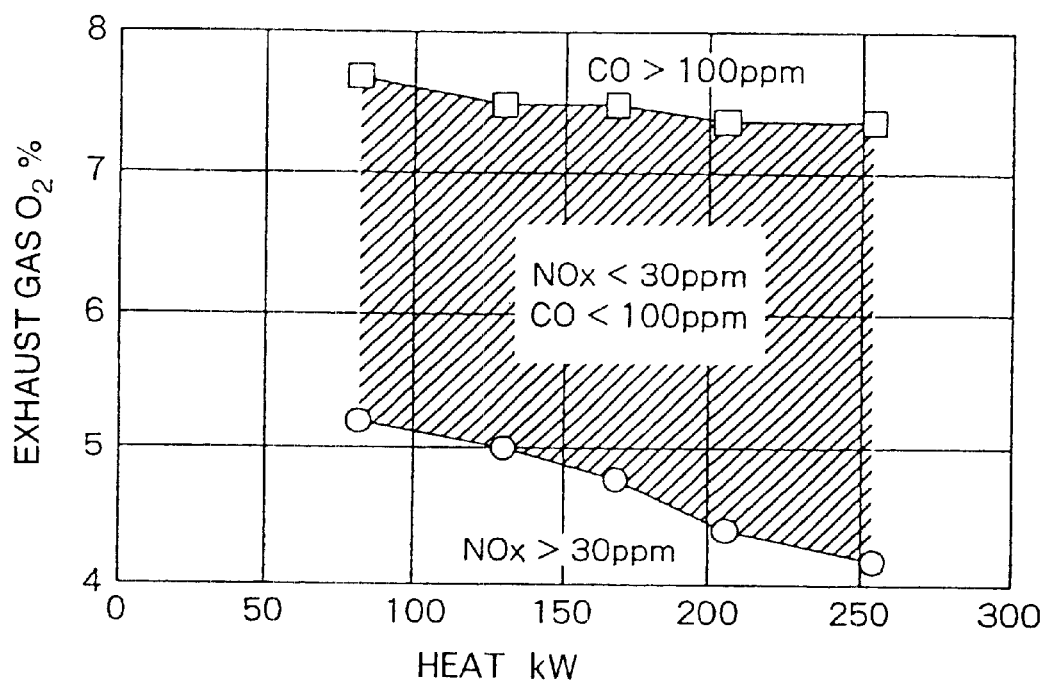
FIG. 14 is a view illustrating a result of combustion experiment.

In FIG. 13, the combustion chamber is compartmented by a flat tube 3A to form a plurality of small combustion chambers. A temperature boundary layer 15C is formed on a side wall surface 15D of the flat tube 3A in the small combustion chambers. Flame radiated from the burner 15 is cooled in the temperature boundary layer 15C and generation of the thermal NO is reduced. Meanwhile, flame in an outside 15B of the temperature boundary layer is hard to be cooled. Therefore, CO is promoted in oxidizing reaction and so CO is promoted in removal.

If the small combustion chambers formed between the flat tubes 3A are made large in width in a direction, in which the flat tubes are aligned, the high temperature regenerator becomes large in volume and an effect of suppressing the generation of NOx is made small. On the contrary, if the small combustion chambers are made small in width in the direction, in which the flat tubes are aligned, a multiplicity of heat transfer surfaces can be arranged in the space to enable making the high temperature regenerator compact. However, if the small combustion chambers are made too narrow in width, flame temperature decreases, so that CO or the unburned gas is generated while NOx can be suppressed.

Hereupon, a range of combustion was experimentally determined, in which NOx ranged in a concentration of 300 ppm or less and CO ranged in a concentration of 100 ppm or less. FIG. 14 shows the result of measurement for the combustion range, which satisfies the condition mentioned above. In the figure, an abscissa indicates an amount of combustion and an ordinate indicates a concentration of an exhaust gas $O_2$. In an explanation of FIG. 14, the same reference numerals as those used in FIG. 13 are used.

In the experiment, a distance a between the burner and the combustion chamber was set to a=40 mm, a length b of the combustion chamber was set to b=16 mm, a width c of the combustion chamber was set to c=200 mm and a height h (a height in a direction perpendicular to a surface in FIG. 13) of the combustion chamber was set to h=560 mm. A ceramic plate having a plurality of substantially circular holes each having a diameter of 1 mm was used for the flame port of the burner 15. The combustion gas was a city gas 13A.

In FIG. 13, a hatched portion ranges to satisfy a relationship NOx<30 ppm and CO<100 ppm (here, NOx and CO are both converted in terms of the relation $O_2$=0%). In a range, in which an amount of combustion is in the range of 130 kW to 250 kW, the exhaust gas $O_2$ can be made about 5 to 7.5% in concentration. In this manner, reduction of NOx and oxidization of CO could be achieved by forming a multiplicity of combustion chambers and developing the temperature boundary layers.

In addition, the following knowledge has been obtained from FIG. 14 with respect to the distance a between the flame port of the burner 15 and the combustion chamber. With high temperature regenerators for the absorption heater/chiller, the exhaust gas $O_2$ is frequently set to about 5% in concentration. When a heat input is made 130 kW in the case where the exhaust gas $O_2$ is 5% in concentration, it is found from FIG. 14 that NOx becomes 30 ppm in amount. When the heat input is made 130 kW or less, NOx exceeds 30 ppm in amount, and when the heat input is equal to or more than 130 kW, NOx becomes less than 30 ppm in amount.

Accordingly, when flame became shorter in length than the flame with the heat input of 130 kW in the case where the distance a was set to a=40 mm as in the experiment shown in FIG. 14, the flame was insufficiently cooled. Then, an atmospheric combustion experiment was performed with the amount of combustion being 130 kW. The Flame at that time had a length of about 120 mm. The distance a=40 mm is one third of the length 120 mm of the flame at the atmospheric combustion.

Then, the atmospheric combustion experiment was performed with the amount of combustion being 250 kW. Flame at this time had a length of 300 mm. With reference to the result of FIG. 14, it can be inferred that the distance a=around 100 mm is substantially a limit of NOx=30 ppm with the exhaust gas $O_2$ being 5% in concentration.

The shorter the distance a, the better, while a flame holding property of the burner surface and a space for a flame rod, an earth rod, a spark rod and the like are necessary. Accordingly, it is desirable to set the distance a to 10 mm or more taking account of these operations and a room for installation.

Since a quantity of combustion of a burner used in a high temperature regenerator has an upper limit of about 250 kW, on the basis of the results mentioned above, a range, in which flame becomes 120 mm to 300 mm in length at the time of the atmospheric combustion, is when the distance a is between 10 mm and 100 mm.

Figure 15:
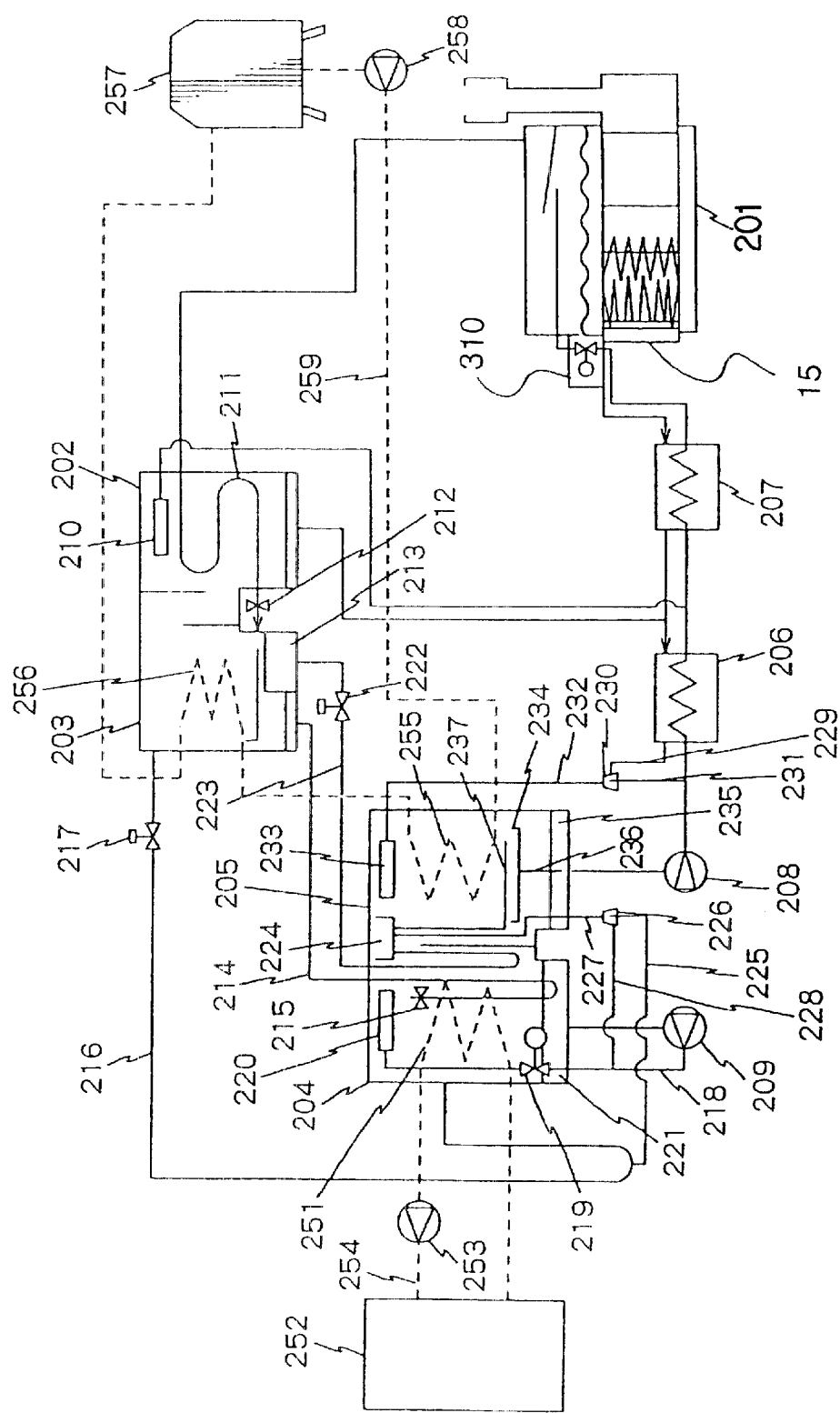
FIG. 15 is a schematic view of an absorption type water heater/chiller.

Next, an embodiment of an absorption water heater/chiller in accordance with the invention will be described with reference to FIG. 15. FIG. 15 is a schematic view illustrating a construction of the absorption water heater/chiller. As shown in the figure, the absorption water heater/chiller includes as main constituent elements a high temperature regenerator 201, a low temperature regenerator 202, a condenser 203, an evaporator 204, an absorber 205, a low temperature heat exchanger 206, a high temperature heat exchanger 207, a solution circulating pump 208, a refrigerant pump 209 and a heating burner.

The high temperature regenerator 201 generates a refrigerant vapor, which generated refrigerant vapor is passed through a heat transfer tube 211 in the low temperature heat exchanger 206 to heat exchange with a solution, which condenses and flows down outside the tube. A throttle 212 is provided midway a tube, which connects the heat transfer tube 211 to the condenser 203. A refrigerant tank 213 is provided in a bottom portion of the condenser 203.

A U-shaped seal and a throttle 215 are provided midway a refrigerant liquid tube 214, which introduces the liquid refrigerant into the evaporator 204 from the condenser 203. A gas phase portion of the condenser 203 and the evaporator 204 are connected via a valve 217 by a refrigerant vapor tube 216, and a U-shaped seal portion is formed midway the refrigerant vapor tube 216. A refrigerant tube 218 connects a discharge side of the refrigerant pump 209 to a refrigerant spraying apparatus 220 via a float valve 219.

A refrigerant tank 221 is provided in a lower portion of the evaporator 204. A refrigerant blow tube 223 connects the evaporator 204 to a refrigerant receiver 224 formed in an upper portion of the absorber 205 via a refrigerant blow valve 222. A refrigerant tube 225 connects a bottom portion of the U-shaped seal in the refrigerant vapor tube 216 to a bubble blowing-out portion 226 of a bubble pump.

A liquid ascending tube 227 for the bubble pump extends from an upper portion of the bubble blowing-out portion 226 of the bubble pump and is opened to the refrigerant receiver 224 disposed in an upper portion of the absorber. A refrigerant tube 228 connected to the bubble blowing-out portion 226 of the bubble pump is made to branch midway the refrigerant tube 218 connected to the refrigerant spraying apparatus 220 in the evaporator.

The low temperature heat exchanger 206 and an ejector pump 230 are connected to each other by a solution return tube 229. A solution tube 231, through which a solution is fed to the ejector pump 230, is made to branch midway a tube, through which a solution is fed from the solution circulating pump 208 to the low temperature heat exchanger 206. The solution is introduced from the ejector pump 230 into a solution spraying apparatus 233 by means of a solution tube 232. A solution tray 234 is provided in a lower portion of the absorber 205, and the solution tray 234 and a solution tank 235 disposed below the absorber are connected to each other by a solution tube 236.

A refrigerant spraying tube 237 sprays the refrigerant to the solution tray 234 from the refrigerant receiver 224. An evaporation heat transfer tube 251 is installed in the evaporator 204. A cold and hot water tube 254 connects between the evaporation heat transfer tube 251 and an indoor machine 252, and a cold and hot water pump 253 circulates a cold and hot water. An absorption heat transfer tube 255 is arranged in the absorber 205 to be connected to a condensation heat transfer tube 256 arranged in the condenser 203. Then, a cooling water tube 259 connects these heat transfer tubes to a cooling tower 257. A cooling water pump 258 circulates the cooling water in these tubes.

When the absorption water heater/chiller constructed in this manner is operated in cooling mode, it operates as follows. At the time of cooling operation, the valves 217 and 222 are closed. After the solution in the solution tank 235 disposed in the lower portion of the absorber 205 is fed to the low temperature heat exchanger 206 by the solution circulating pump 208, a part of the solution is fed to the high temperature regenerator 201 through the high temperature heat exchanger 207 and the remainder is fed to the low temperature regenerator 202 to be sprayed from the spraying apparatus 210.

The solution fed to the high temperature regenerator 201 is heated by the burner to boil to generate a refrigerant vapor. After the generated refrigerant vapor is fed to the low temperature regenerator 202 and made to be condensed in the heat transit tube 211, it is fed to the condenser 203 through the throttle 212. Heat of condensation at this time heats the solution, which is sprayed from the spraying apparatus 210 to flow down outside of the heat transfer tube 211, and again generates the refrigerant vapor. The generated refrigerant vapor is fed to the condenser 203, is cooled by the cooling water, which flows through the condensation heat transfer tube 256, to be condensed, and is made to join with the refrigerant from the high temperature regenerator 201 to be stored in the refrigerant tank 213.

A thick solution, which has generated the refrigerant vapor in the high temperature regenerator 201 to be enriched, overflows from the high temperature regenerator 201 to flow into the float box 310, and thereafter, is fed to the high temperature heat exchanger 7. After the thick solution exchanges heat with a thin solution from the absorber in the high temperature heat exchanger 7 to be reduced in temperature, it joins with the thick solution from the low temperature regenerator 202. The thick solution joined exchanges heat with the thin solution from the absorber 205 in the low temperature heat exchanger 206 to be further reduced in temperature, is fed to the solution spraying apparatus 233 through the solution return tube 229 and the solution tube 232 by the ejector pump 230 to be sprayed in the absorber 205. The thick solution as sprayed absorbs the refrigerant vapor from the evaporator 204 while being cooled by the cooling water flowing through the absorption heat transfer tube 255, thus making a thin solution having a low concentration. The thin solution is collected in the solution tray 234 and is returned to the solution tank 235 through the solution tube 236.

The liquid refrigerant stored in the refrigerant tank 213 disposed below the condenser 203 overflows from the refrigerant tank 213 to flow into the evaporator 204 via the refrigerant liquid tube 214 and the throttle 215. The liquid refrigerant in the refrigerant tank 221 disposed below the evaporator 204 is fed to the refrigerant spraying apparatus 220 through the refrigerant tube 218 and the float valve 219 by the refrigerant pump 209. The liquid refrigerant sprayed over the evaporation heat transfer tube 251 disposed in the evaporator 4 exchanges heat with the cooling water, which flows through the group of tubes, to evaporate. At this time, the liquid refrigerant takes an evaporation latent heat from the cooling water to provide for a refrigerating action. The evaporated refrigerant flows out to the absorber 205 to be absorbed into the thick solution, which flows down in the absorber 5.

The cooling water having been cooled in the cooling tower 257 is fed to the absorber 205 by means of the cooling water pump 258 to take the absorption heat in the absorption heat transfer tube 255 to rise in temperature. Then, the cooling water is fed to the condenser 3 to take condensation heat in the condensation heat transfer tube 256 to further rise in temperature. Thereafter, the cooling water is returned to the cooling tower 257 to be cooled. The cooling water flowing through the evaporation heat transfer tube 251 arranged in the evaporator 204 has the evaporation latent heat taken away by the evaporation of the refrigerant. Then, the cooling water is fed to the indoor apparatus 252 by means of the cooling and heating water pump 253 to cool a room. The cooling water having cooled the room to rise in temperature is returned to the evaporator to be again cooled due to the evaporation of the refrigerant.

When a cooling load disappear during the cooling operation, a stop signal generates in the absorption water heater/chiller. Then, the cooling and heating water pump 253, the cooling water pump 258, the cooling tower 257 and the burner 304 immediately stop, and the refrigerant pump 209 also simultaneously stops. However, only the solution pump 208 continues to operate for a predetermined period of time in order to dilute the thick solution in the cycle. At this time, to prevent the refrigerant from freezing, the refrigerant blow valve 222 is opened to permit the refrigerant in the refrigerant tank 213 to be conducted to the solution tray 234 through the refrigerant blow tube 223, the refrigerant receiver 224 and the refrigerant spraying tube 237. The solution in the refrigerant tank mixes with the solution stored on the solution tray, thus diluting the solution. Since the solution is lowered in a refrigerant vapor absorbing capacity when the solution is reduced in concentration, it is possible to prevent the refrigerant and the hot and cooling water from freezing.

The absorption water heater/chiller shown in FIG. 15 operates in heating mode in the following manner. When a heating operation is selected, the valves 217 and 22 are opened. The cooling water pump 258 is stopped to suspend the cooling water flowing to the absorption heat transfer tube 255 in the absorber 201 and to the condensation heat transfer tube 256 in the condenser 201. The refrigerant pump 209 is also stopped.

The solution in the solution tank 235 provided in the lower portion of the absorber 201 is fed to the low temperature heat exchanger 206 by means of the solution circulating pump 208. Thereafter, a part of the solution is fed to the high temperature regenerator 201 through the high temperature heat exchanger 207 and the remainder thereof is sprayed in the low temperature regenerator 202 from the spraying apparatus 210 of the low temperature regenerator 202. The solution fed to the high temperature regenerator 201 is heated and boiled by the burner to generate the refrigerant vapor.

After the generated refrigerant vapor is fed to the low temperature regenerator 202 and condensed in the heat transfer tube 211 disposed in the low temperature regenerator 202, it is fed to the condenser 203 through the throttle 212. Heat of condensation generated at this time heats the solution, which is sprayed from the spraying apparatus 210 to flow down outside the heat transfer tube 211. The heated solution again generates a refrigerant vapor. The generated refrigerant vapor is fed to the condenser 203. Since the cooling water does not flow in the group of tubes arranged in the condenser 203, the refrigerant vapor is fed to the evaporator 205 through the valve 217 and the refrigerant vapor tube 216 while being not condensed and liquidated.

A part of the refrigerant vapor is introduced into the refrigerant receiver 224 from the U-shaped seal portion of the refrigerant vapor tube 216 through the refrigerant tube 225, the bubble blowing-out portion 226 of the bubble pump and the liquid ascending tube 227. Thereafter, the part of the refrigerant vapor is absorbed by the solution, which is sprayed from the refrigerant spraying tube 237 in the absorber 205, and is stored in the solution tray 234. The liquid refrigerant in the condenser 203 is introduced into the evaporator 204 through the refrigerant blow tube 223 and the refrigerant blow valve 222.

In the evaporator 204, the refrigerant vapor introduced from the condenser exchanges heat with a hot water, which flows through the evaporation heat transfer tube 251, to be condensed and liquidated. Condensation latent heat produced at this time heats the hot water to produce a heating capacity. The condensed and liquidated liquid refrigerant is stored in the refrigerant tank 221 and is fed to the bubble blowing-out portion 226 of the bubble pump through the refrigerant tube 228 branched from the refrigerant tube 218. An action of the bubble pump causes the liquid refrigerant to ascend through the liquid ascending tube 227 to flow into the refrigerant receiver 224, and is fed to the solution tray 234 of the absorber 205 from the solution spraying tube 237.

A thick solution enriched through separation of the refrigerant vapor in the high temperature regenerator 201 is introduced into the high temperature heat exchanger 207 from the high temperature regenerator 1A through the float box 310. The thick solution having flown into the high temperature heat exchanger 207 exchanges heat with a thin solution introduced from the absorber in the high temperature heat exchanger 207 to be lowered in temperature, and thereafter, joins with the thick solution introduced from the low temperature regenerator 203.

The thick solution thus joined exchanges heat with the thin solution, which is introduced from the absorber 205, in the low temperature heat exchanger 206 to be further lowered in temperature, and thereafter is fed to the solution return tube 229 and the solution tube 232. Thereafter, the thick solution is fed to the solution spraying apparatus 233 to be is sprayed in the absorber 205. Since the cooling water does not flow through the absorption heat transfer tube 255, the sprayed thick solution flows down through the absorption heat transfer tube 255 while not performing heat exchange. Then, the thick solution is made to mix with the liquid refrigerant stored in the solution tray 234 and is returned to the solution tank 235 through the solution tube 236.

The hot water having been heated by the evaporation heat transfer tube 251 in the evaporator 205 is fed to the indoor machine by the water cooling and heating pump 253, heats the room to be lowered in temperature, and thereafter, is again returned to the evaporator.

Figure 1:
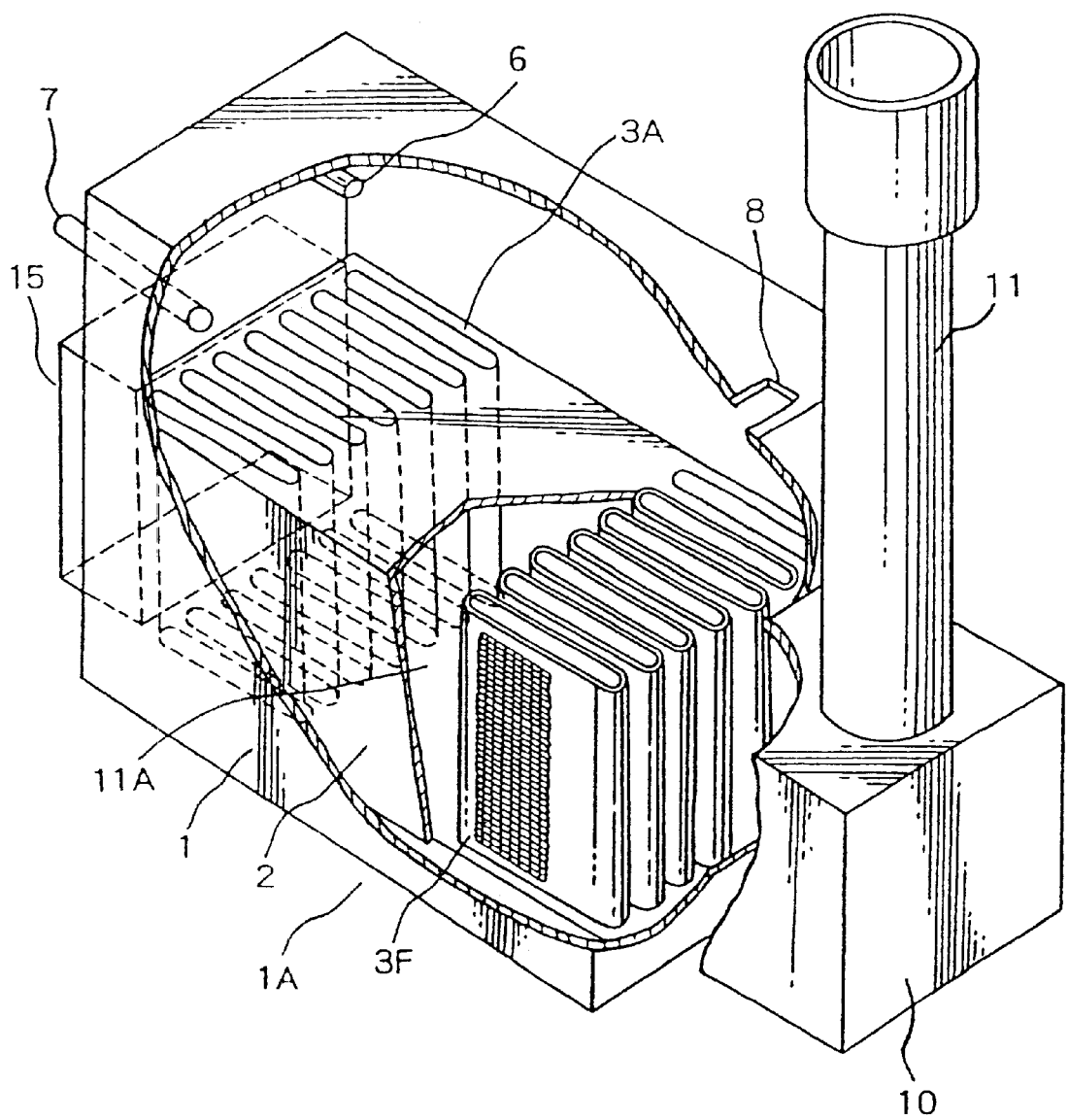
FIG. 1 is a partially cross sectional, perspective view showing a first embodiment of a high temperature regenerator in accordance with the invention.
Figure 2:
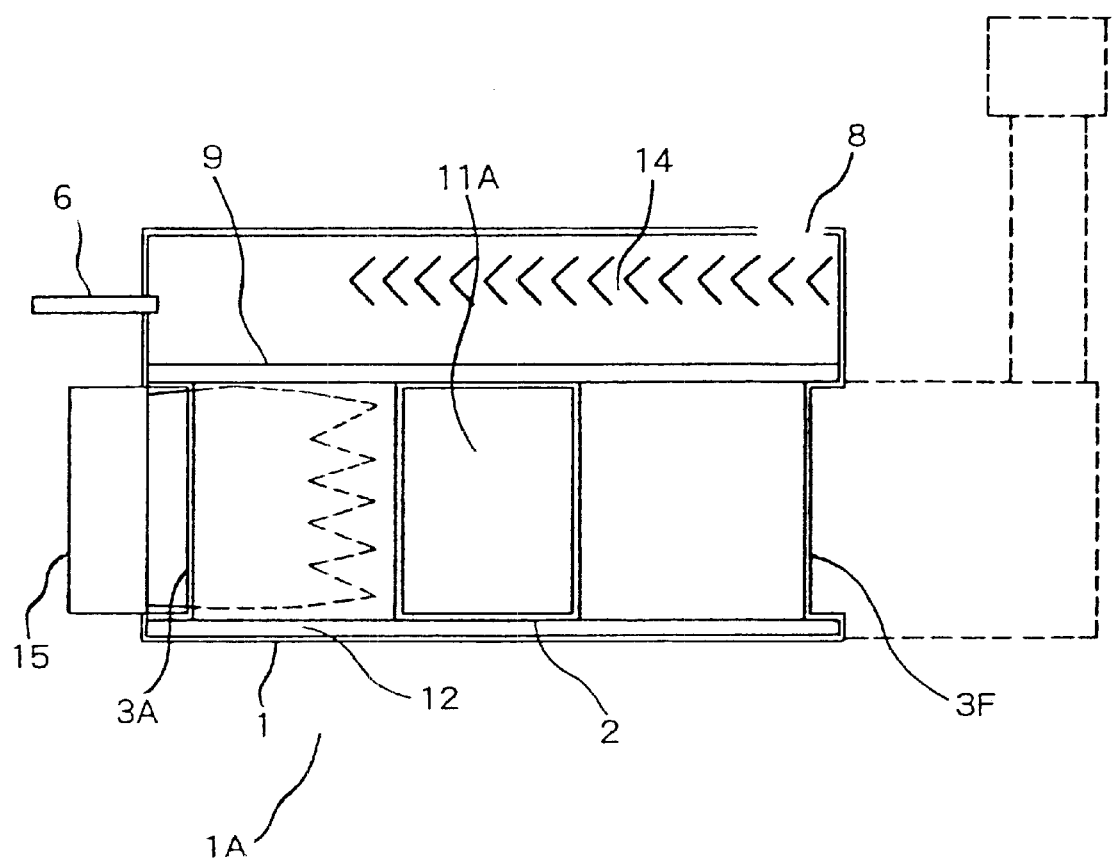
FIG. 2 is a vertical cross sectional view showing the high temperature regenerator of FIG. 1.
Figure 3:
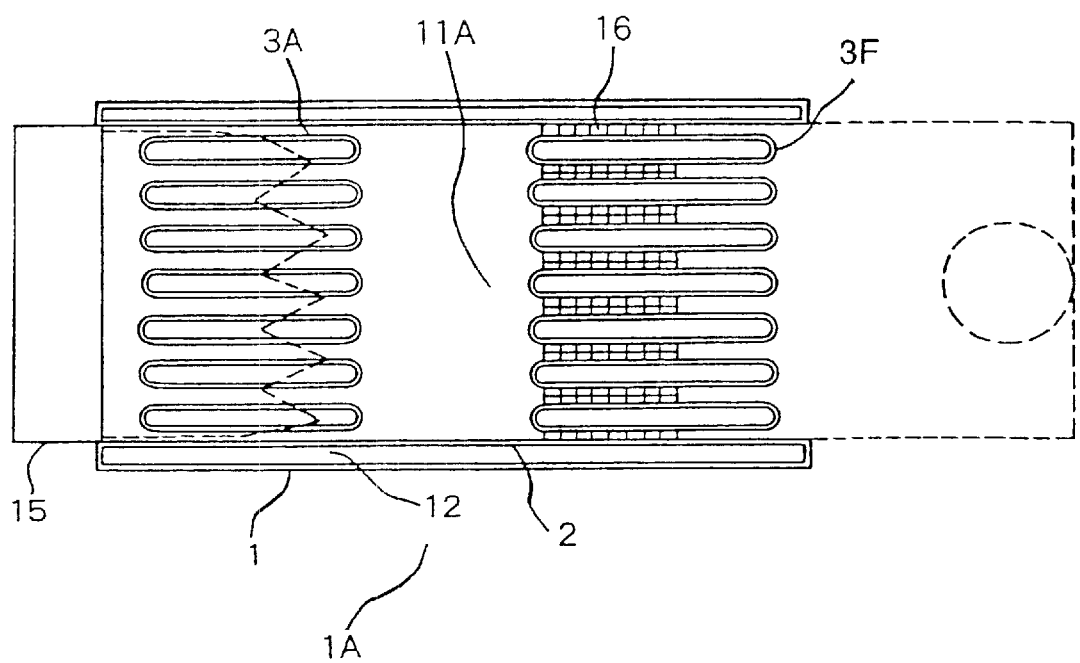
FIG. 3 is a horizontal cross sectional view showing the high temperature regenerator of FIG. 1.

Next, an embodiment of a high temperature regenerator used for the absorption water heater/chiller and several modification thereof will be described with reference to FIGS. 1 to 8. FIGS. 1 to 3 inclusive are views showing a first embodiment of the invention. FIG. 1 is a perspective view showing a high temperature regenerator in a partly cross section, FIG. 2 being a vertical cross sectional view of FIG. 1 and FIG. 3 being a horizontal cross sectional view of FIG. 1.

In these drawings, reference numeral 1 denotes an outer cylinder, 2 denotes an inner cylinder, 3F is a solution tube provided in the inner cylinder 2 on a side of a flue box and having a flat-shaped cross section, and denotes a burner. The burner 15 is one made of, for example, ceramics, and throws many flames substantially uniformly from a surface of the burner, as shown by a broken line in FIG. 2. The reference numeral 6 denotes a solution inflow tube which permits the thin solution to flow into a space above the liquid chamber, 7 denotes a solution outflow tube which permits the thick solution to flow out, 8 denotes a refrigerant vapor outflow port provided in an upper portion of the outer cylinder 1, 9 denotes a solution, 10 denotes a flue box, 11 denotes a flue, 11A denotes a combustion chamber provided in the inner cylinder 2, and 12 denotes a liquid chamber defined by the outer cylinder 1 and the inner cylinder 2.

The high temperature regenerator 1A, an external appearance and an interior of which are shown in FIG. 1, is provided with the outer cylinder 1, the inner cylinder 2, a plurality of solution tubes 3A and 3F, the burner 15, the solution inflow tube 6 and so on. The inner cylinder 2 is arranged in the outer cylinder 1, the solution 9 is held between the both, and the inner cylinder 2 is immerged in the solution 9. The burner 15 passes through the inner cylinder 2 to be mounted to an outer side surface of the outer cylinder 1, and an interior of the inner cylinder 2 defines the combustion chamber 11A. The outer cylinder 1 and the inner cylinder 2 define the liquid chamber 12. A plurality of first solution tubes 3A and second solution tubes 3F, which communicate between upper and lower liquid chambers 12 of the inner cylinder 2, respectively, are formed upstream and downstream of the combustion chamber 11A. Inner portions of these solution tubes 3A and 3F are filled with the solution 9.

A group of first solution tubes 3A on a side of the burner 15 and a group of second solution tubes 3F on a side of the flue box 10 both have a flat cross sectional shape along the combustion gas flow passages. The tubes are aligned in several lines with straight portions of the flat shape being parallel to one another. Combustion gas passages, that is, small combustion chambers are defined between respective adjacent ones of a plurality of solution tubes 3A and between respective adjacent ones of a plurality of solution tubes 3F.

Heat transfer fins are not formed on outer surfaces of the solution tubes 3A disposed upstream of the combustion gas. However, the fins 16 are formed on downstream, outer surfaces of the solution tube 3F disposed downstream of the combustion gas. And, the fins 16 on the solution tube 3F are more in the number on an upstream side (a side of the burner) of the combustion gas than on a downstream side (a side of the flue box 10) of the combustion gas.

The solution inflow tube 6 and the solution outflow tube 7, respectively, are disposed above the solution 9 in the outer cylinder and on a side surface of the outer cylinder 1, and the refrigerant vapor outflow port 8 is formed on an upper surface of the outer cylinder.

When passing through the upstream small combustion chambers interposed by flat plate surfaces defined by the straight portions of the flat shape of the plurality of adjacent solution tubes 3A, flame thrown from the burner 15 slowly burns while being cooled, and heats the solution 9 in the group of upstream solution tubes 3A by virtue of radiation and convection heat transfer. The combustion gas having heated the group of upstream solution tubes heats the solution 9 in the group of downstream solution tubes 3F by virtue of convection heat transfer when passing through the downstream small combustion chambers interposed between the flat plate surfaces defined by the straight portions of the flat shape of the plurality of adjacent solution tubes 3F. The combustion gas having heated the group of downstream solution tubes flows into the flue box 10 to be discharged outside through the flue 11 connected to the upper portion of the flue box 10.

The heated solution 9 is made to boil to generate a refrigerant vapor, and the generated refrigerant vapor makes an ascending flow to ascend in the solution tube 3A and the solution tube 3F and through the flow passage between the outer cylinder 1 and the inner cylinder 2. Then, the refrigerant vapor emerges above the liquid surface and flows out into a refrigerant tube (not shown) from the refrigerant vapor outflow port 8 through the mist separator 14.

The thin solution introduced from the absorber (not shown) passes through the solution inflow tube 6 to be introduced into the high temperature regenerator 1A. The solution having been heated and boiled in the high temperature regenerator 1A to change from the thin solution to the thick solution having a high concentration is fed to a solution tube (not shown) from the solution outflow tube 7.

In accordance with the present embodiment, in the solution tube 3A disposed upstream of the combustion gas, the gas temperature exceeds 1000° C., heat flux becomes high on a side of the burner 15, and heat flux becomes low on a side of the flue of the solution tube 3A. On the contrary, in the solution tube 3F disposed downstream of the combustion gas, the gas temperature is at most 1000° C. Since the multiplicity of fins 16 are provided on the combustion gas surfaces on the side of the burner to increase an area of heat transfer surfaces on the combustion gas side, heat flux on the solution tubes 3F on the side of the burner becomes high. On the contrary, an almost no or small number of the fins 16 are provided on the combustion gas surfaces of the solution tubes 3F toward the flue. Accordingly, the heat transfer area on the gas side is reduced in area, and the gas temperature decreases, which cooperate to produce a multiplier effect that the heat flux in the solution tubes 3F on the flue side decreases.

Thus, the arrangement of the group of the solution tubes in the combustion chamber causes the solutions in the solution tubes 3A and 3F to flow upward on the side of the burner 15 and flow down on the side of the flue 14, thus forming a spiral liquid flow. Such spiral liquid flow can prevent stagnation of the solution and increase a speed of the upward flow in a high heat flux region. Accordingly, it is possible to enhance a boiling heat transfer rate in that portion, into which the combustion gas flows, and to prevent local corrosion and deterioration of the solution tubes. In addition, the solution tubes mentioned above can be easily made flat tubes by pressing a circular tube from laterally.

Figure 4:
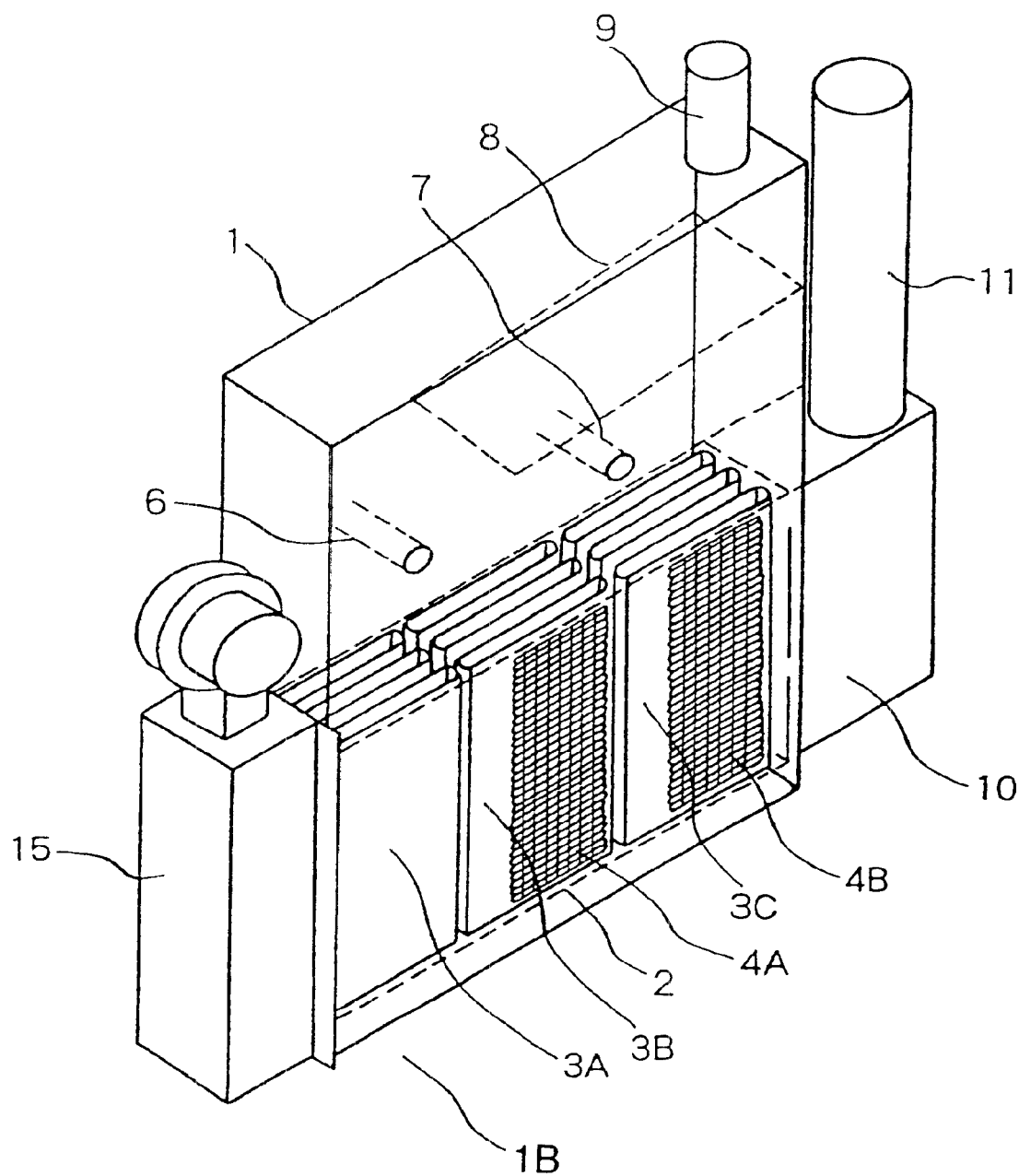
FIG. 4 is a partially cross sectional, perspective view showing a high temperature regenerator in accordance with a second embodiment of the invention.

Next, a second embodiment of the invention will be described with reference to FIG. 4. The present embodiment is different from the first embodiment shown in FIG. 1 in that a group of flat tubes are formed in three lines in a direction, in which the combustion gas spouts. More specifically, the groups of flat tubes 3A, 3B and 3C have a horizontal cross section of a rectangular shape having round corners. The flat tubes are arranged with a slight gap so that straight portions of the rectangular shape are parallel to one another. Combustion gas passages are defined between the respective tubes, which constitute the group of flat tubes 3A, 3B and 3C. While fins are not formed on surfaces of the group of flat tubes 3A on the side of the combustion chamber, fins 4A and 4B are provided on surfaces of the groups of flat tubes 3B and 3C on a side of the combustion chamber.

When passing through the flow passages interposed between the flat surfaces of the adjacent flat tubes 3A, flame spouting from the burner 5 slowly burns while being cooled, and heats the solution in the group of flat tubes 3A due to radiation and convection heat transfer. Thereafter, when passing through the flow passages interposed between the flat plate surfaces of the adjacent flat tubes 3B, flame heats the solution in the group of flat tubes 3B due to convection heat transfer. Further, when passing through the flow passages interposed between the flat surfaces of the adjacent flat tubes 3C, flame heats the solution in the group of flat tubes 3C due to convection heat transfer. Flame enters into the flue box 10 to be discharged outside the high temperature regenerator through the flue 11 connected to the upper portion of the flue box 10.

As mentioned above, according to the embodiment, the principle mentioned above applies such that, when passing through the group of first flat tubes 3A, the combustion gas is cooled by the solution in the flat tube, and so generation of thermal NOx is suppressed to enable making NOx small in amount. Further, temperature boundary layers are produced on surfaces of the respective tubes, which constitute the groups of flat tubes 3A, 3B and 3C, and the combustion gas can be maintained high in temperature in flow passages externally of the temperature boundary layers, so that it is possible to completely burn the combustion gas. Accordingly, it is possible to suppress generation of CO without substantially setting a space, which does not contribute to heat transfer. Accordingly, the high temperature regenerator and hence the absorption water heater/chiller can be made small-sized, which contributes to saving of resources.

Figure 5:
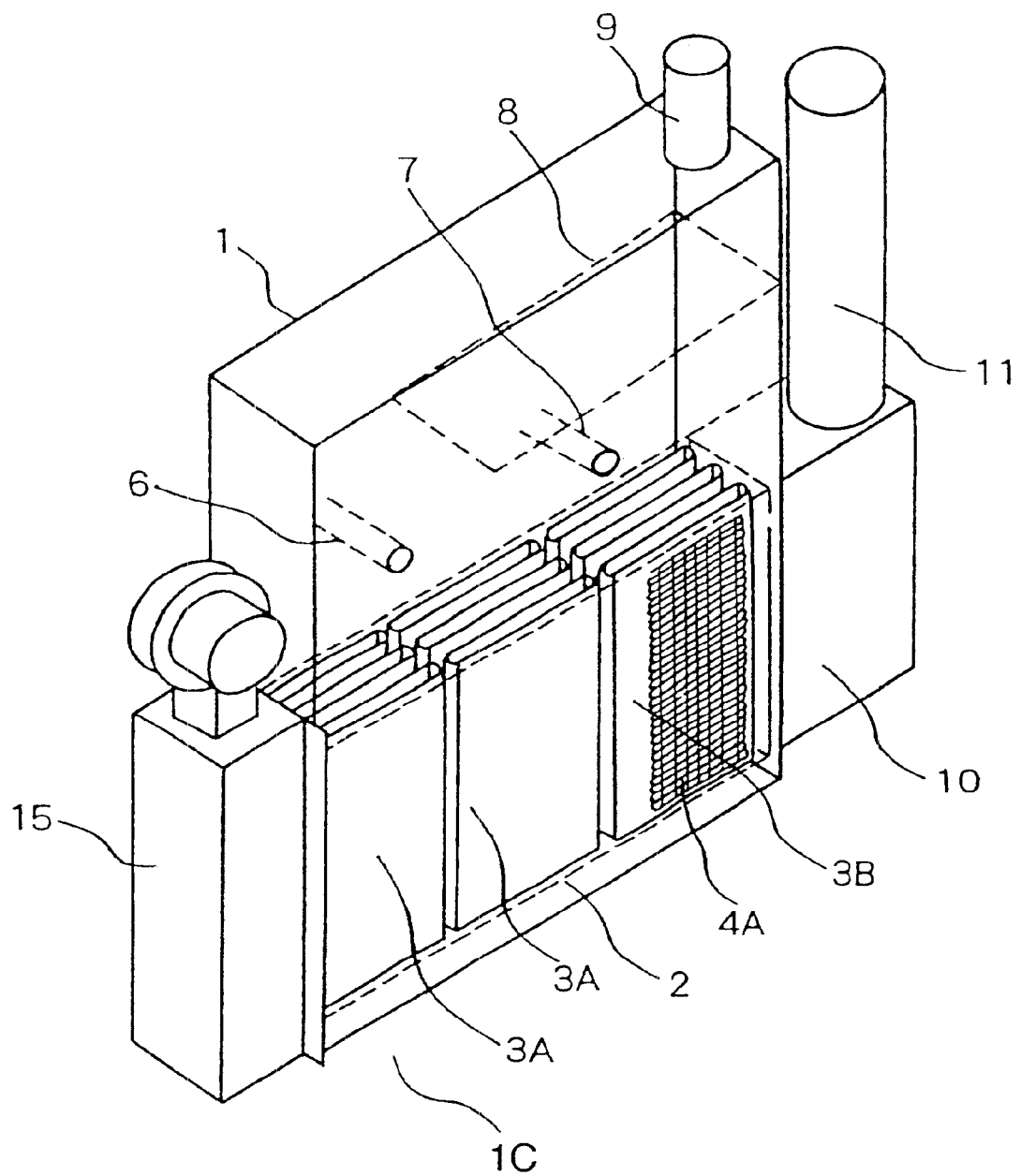
FIGS. 5 to 8 are perspective views, respectively, showing various modifications of the second embodiment shown in FIG. 4.

FIG. 5 shows a modification of the second embodiment of the high temperature regenerator according to the invention. The present modification is different from the second embodiment shown in FIG. 4 in that any heat transfer fins are not provided on outer surfaces of the respective solution tubes, which constitute the central group of flat tubes among three groups of flat tubes constituting the high temperature regenerator 1B. More specifically, among the three groups of flat tubes, which constitute the high temperature regenerator 1B, two groups of flat tubes on the side of the gas burner 5 are comprised of flat tubes having the same shape, and the group of flat tubes 3B having fins are arranged on the downstream side of these two groups of flat tubes 3A and 3A. With the group of flat tubes 3B with the fins, the fins 4A are formed on the surfaces on the side of the combustion chamber.

The present modification is particularly effective when the combustion gas is high in flow speed. More specifically, when the combustion gas is high in flow speed, the duration, during which the combustion gas passes by the flat tubes, becomes short, and the combustion gas is not so much reduced in temperature. Accordingly, to prolong the passing time of the combustion gas, it is contemplated that the flat tubes be extended in length in the flow direction of the combustion gas. However, the pressure in the high temperature regenerator of the absorption water heater/chiller is vacuum, so that those wall surfaces, which define the flow passages, deform toward the liquid side if the flat tubes are extended in length in the flow direction of the combustion gas. In this case, the flow passages on the liquid side decrease in cross sectional area to impede flowability of the solution. Hereupon, to reduce a length of flow per one flat tube in the flow direction, the flat tubes had better be divided before and behind.

Hereupon, as mentioned above, when the combustion gas is high in flow speed, the combustion gas is highly hard to be decreased in temperature even by the solution in the flat tubes. Accordingly, if fins adapted to promote heat exchange are not provided on a side near the gas burner so that the flat tubes are not increased in temperature, and fins are provided only on the downstream side, it is possible to prevent corrosion of flat tubes due to local heating. In the present modification, for the above reasons, groups of flat tubes with no fins are arranged in two rows in the flow direction of the combustion gas, thus satisfying the requirement mentioned above. Accordingly, deformation of the groups of flat tubes is reduced as much as possible and the groups of flat tubes are prevented from being corroded and deteriorated.

Figure 6:
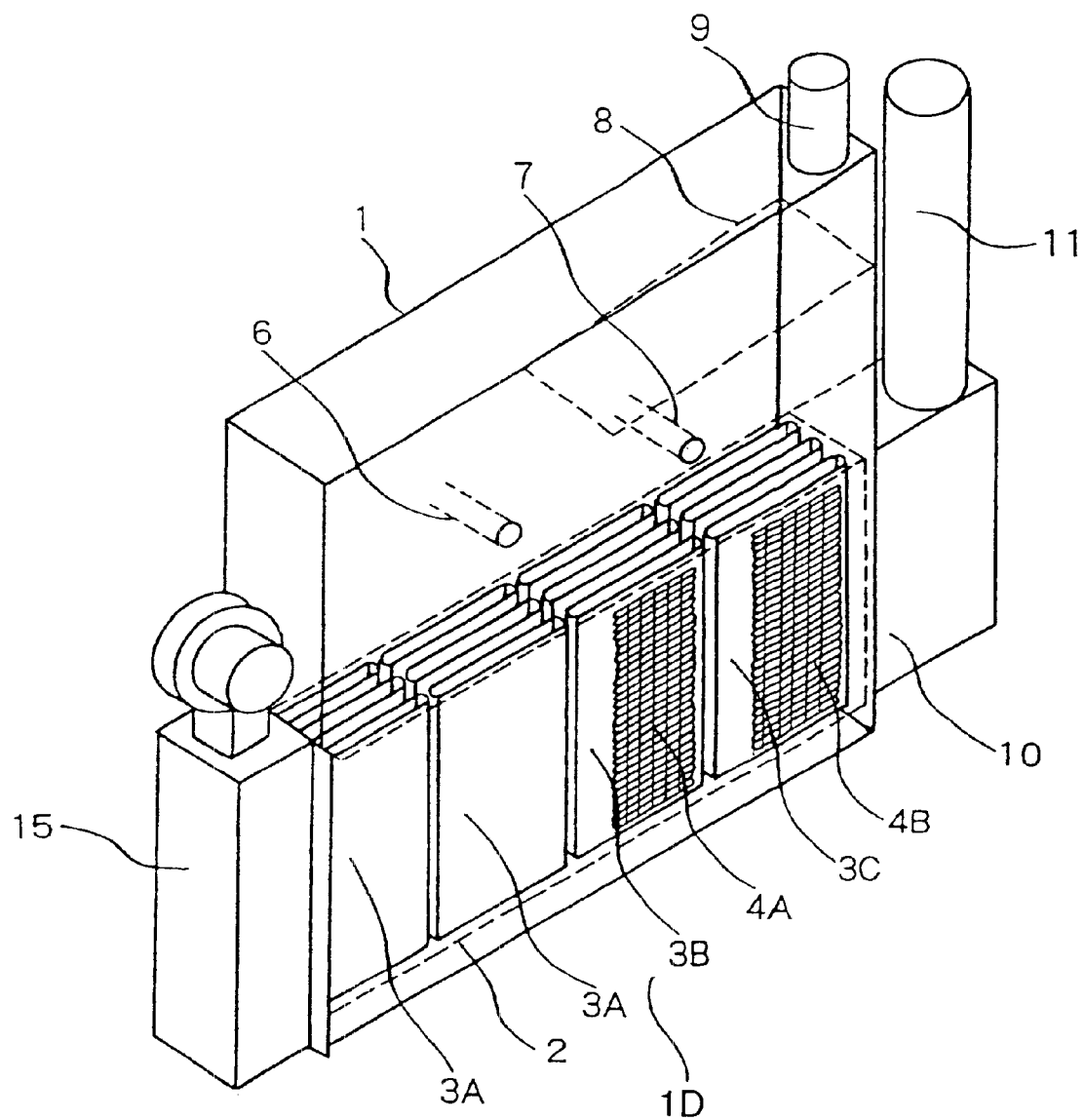

A further modification of the second embodiment according to the invention will be described with reference to FIG. 6. The present modification is different from the second embodiment and the modification mentioned above in that two groups of flat tubes 3B and 3C with fins are provided behind two groups of flat tubes 3A and 3A, which is provided with no fins and constitute the high temperature regenerator 1C. In the modification mentioned above, the group of flat tubes with fins 4B are arranged between the group of flat tubes 3B with fins 4A and the flue box 10. In this case, heat energy of the combustion gas can be further recovered, so that the high temperature regenerator is enhanced in efficiency. In addition, the above arrangement is particularly effective when the respective flat tubes constituting the group of flat tubes are increased in deformation and the flat tubes must be reduced in length.

Figure 7:
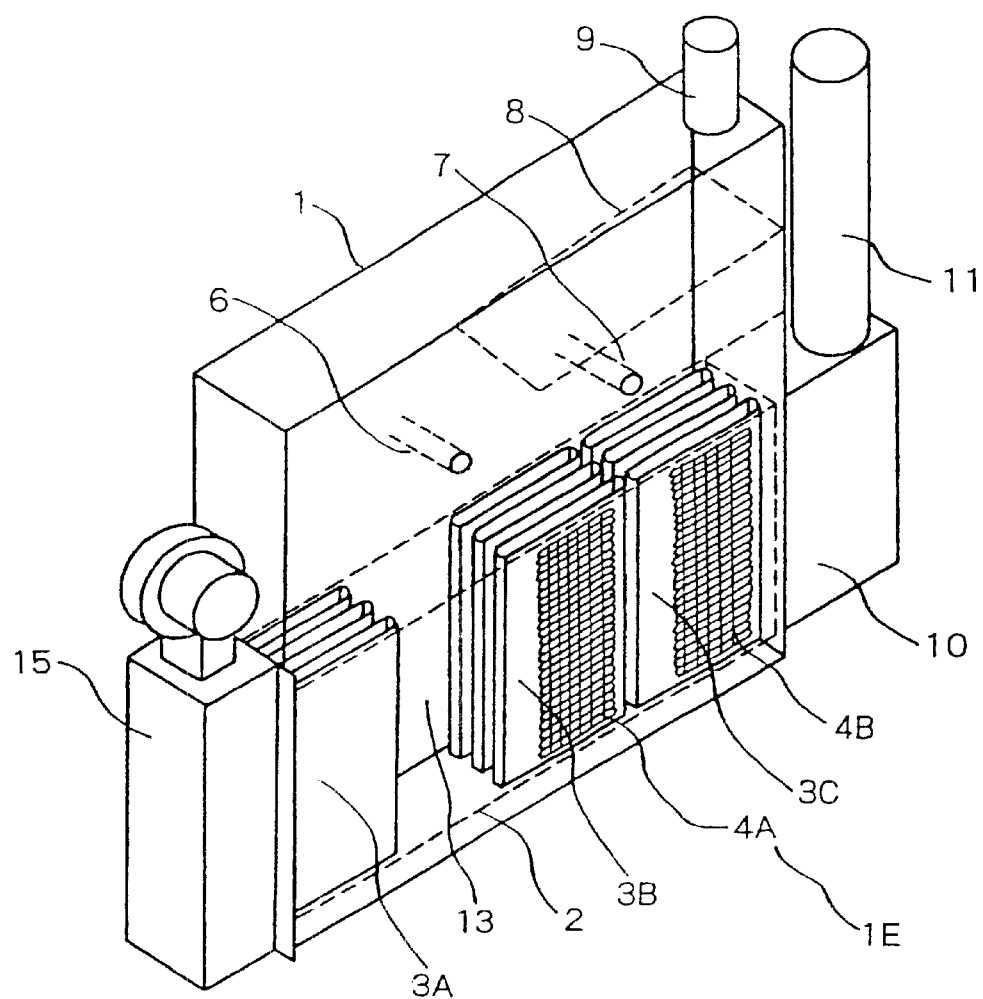

A further modification of the second embodiment according to the invention will be described with reference to FIG. 7. The present modification is different from the modification shown in FIG. 6 in whether the second group of flat tubes is provided with or without fins. More specifically, with the present modification, a space is defined by not providing the second group of flat tubes with no fins, and it promotes complete combustion of the combustion gas.

More specifically, when passing through the flow passages interposed between the flat surfaces of the group of adjacent flat tubes 3A, flame spouting from the burner 15 slowly burns while being cooled, and heats the solution in the group of flat tubes 3A due to radiation and convection heat transfer in the same manner as in the respective modification mentioned above. When passing through the space 13 between the groups 3A and 3A of flat tubes, the flame promotes mixing between the temperature boundary layers developed between the groups of flat tubes 3A and 3B and the main flow of the combustion gas, thereby making the gas temperature distribution uniform.

In this modification, the space 13 is arranged between the group of flat tubes 3A and the group of flat tubes 3B, so that mixing between the temperature boundary layers developed between the respective flat tubes constituting the group of flat tubes 3A and the main flow is promoted to make the gas temperature distribution uniform, thus enabling enhancing a heat exchange efficiency when the combustion gas passes between the respective flat tubes, which constitute the group of flat tubes 3B.

Figure 8:
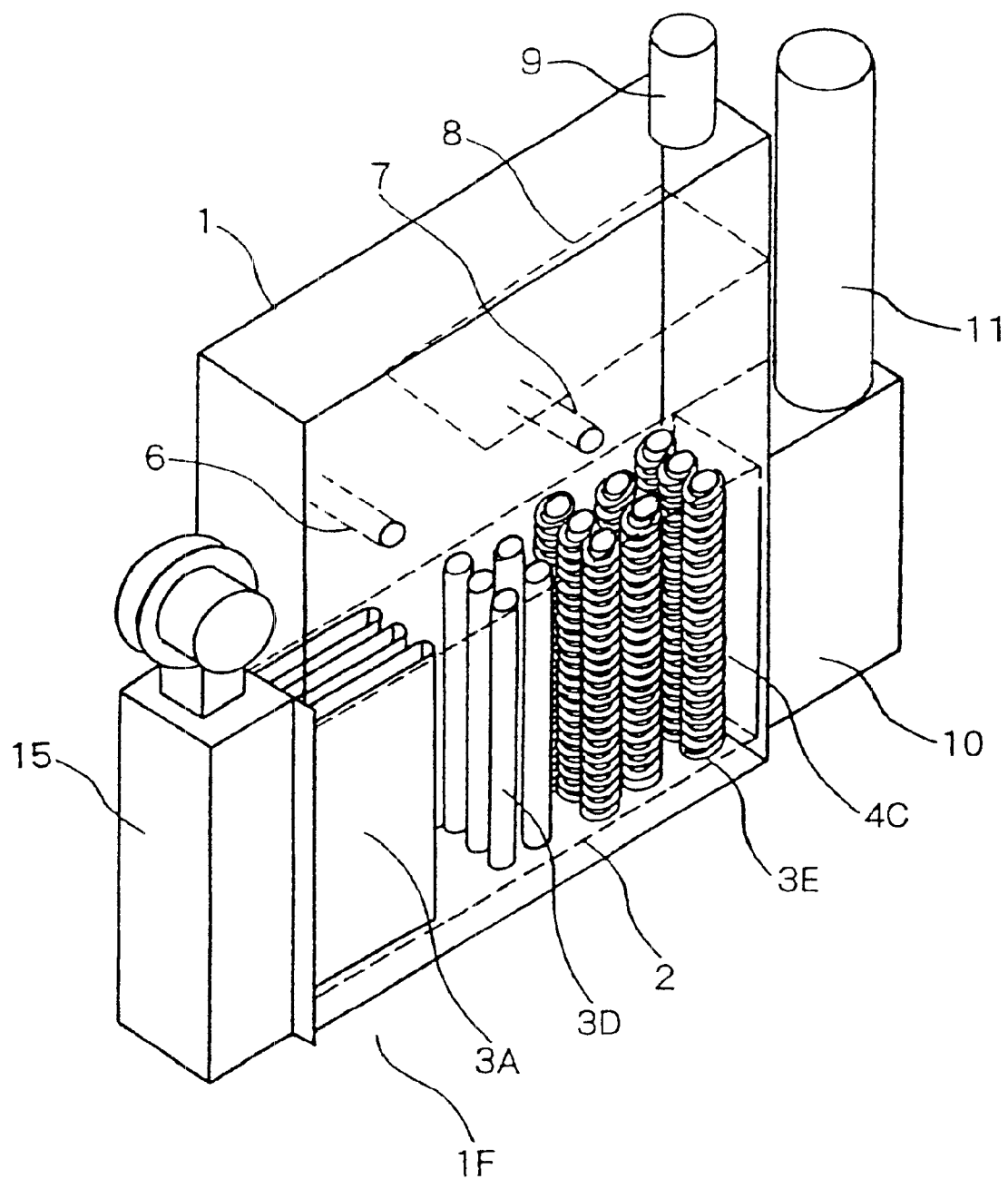

A third embodiment of the invention will be described with reference to FIG. 8. With a high temperature regenerator if shown in FIG. 8, the group of flat tubes 3A adjacent to the gas burner 15 are arranged and constructed in the same manner as in the above respective embodiments and modifications, but groups of solution tubes arranged on a downstream side of the group of flat tubes 3A in a flow of the combustion gas are different from those of the above respective embodiments and modifications.

More specifically, a plurality of solution tubes 3D and 3E, which communicate between the upper and lower liquid chambers of the inner cylinder 2 and have a circular cross sectional shape, are arranged downstream of the group of flat tubes 3A within the combustion chamber. The group of flat tubes and the plurality of solution tubes having a circular cross sectional shape are filled with the solution. Any fins are not formed on outer surfaces of the plurality of solution tubes 3D having a circular cross sectional shape. On the contrary, fins 4C are formed on outer surfaces of the plurality of solution tubes 3E having a circular cross section. The others in the third embodiment are the same as those in the above respective embodiments.

When passing through the flow passages interposed between the flat surfaces of the group of adjacent flat tubes 3A, flame spouting from the burner 5 slowly burns while being cooled, and heats the solution in the group of flat tubes 3A due to radiation and convection heat transfer Thereafter, when passing outside the plurality of solution tubes 3D and 3E having a circular cross sectional shape, the flame heats the solution in the plurality of solution tubes 3D and 3E having a circular cross sectional shape due to convection heat transfer. In addition, it goes without saying that conventionally used heat transfer tubes can be used for solution tubes having a circular cross sectional shape.

In accordance with the present embodiment, the groups of flat tubes are arranged near the gas burner, whereby generation of thermal NOx is suppressed to enable making NOx small in amount. Meanwhile, complete combustion of CO generated from the combustion gas is achieved between the respective solution tubes, which constitute the group of solution tubes, whereby it is possible to suppress generation of CO without the provision of a space, which does not attribute to heat transfer. Accordingly, it is possible to make the high temperature regenerator and hence the absorption water heater/chiller compact.

In the respective embodiments and modifications, the temperature boundary layers are promoted in developing in the combustion chamber, and so the burner may be of a gun type. More preferably, the burner is of a type, in which many flames are made to spout uniformly from the burner surface. Such type includes ceramic burners, in which a multiplicity of small circular holes are regularly formed by a ceramic sintering agent.

Further, in the above description, the liquid chamber is also provided in the lower portion of the combustion chamber to be communicated with the flat tubes. However, such liquid chamber may not be formed in the lower portion of the combustion chamber. Alternatively, the liquid chamber may be provided in the lower portion of the combustion chamber but the flat tubes may not be communicated with such liquid chamber. The reason for this is that due to utilization of flat tubes, heating of the combustion gas causes the absorption solution to develop convection in the solution tubes. With such arrangement, the high temperature regenerator can be further made small-sized.

In addition, the high temperature regenerator according to the invention has been described as a high temperature regenerator for absorption water heaters/chillers, but can be similarly applied to a high temperature regenerator for absorption type refrigerators indicated In JIS B8622-1994.

In accordance with the invention, a multiplicity of flat tubes are arranged in the flame port plate of the burner at a distance of 10 mm to 100 mm therefrom, so that it is possible to make the absorption water heater/chiller and the high temperature regenerator used therefor compact. Further, the temperature boundary layers are formed on the wall surfaces of the flat tubes, whereby flame in the temperature boundary layers is cooled and the thermal NOx decreases. Meanwhile, flame outside the temperature boundary layers is hard to be cooled, so that it is possible to promote removal of CO.

What is claimed is:

1. An absorption water heater/chiller comprising:
    a high temperature regenerator and a low temperature regenerator for heating an absorption solution, which is generated by having an absorbent absorbing a refrigerant, and for evaporating the refrigerant to concentrate the absorption solution;
    a condenser for condensing a refrigerant vapor generated in the low temperature regenerator at the time of cooling;
    an evaporator mounting therein a heat transfer tube for circulation of a heating medium and for exchanging heat between a liquid refrigerant generated in said condenser or a vapor refrigerant generated in said high temperature regenerator and with the heating medium in said heat transfer tube; and
    an absorber communicated with the evaporator and for having the absorption solution, which has concentrated in said high temperature regenerator and said low temperature regenerator, absorbing the refrigerant vapor introduced from said evaporator, and
    wherein said high temperature regenerator comprises an inner cylinder, an outer cylinder, which covers said inner cylinder, and combustion means mounted to said outer cylinder and for burning a combustible gas in said inner cylinder, and wherein a plurality of first flat tubes, which are lengthy in a flow direction of a combustion gas, are provided in the vicinity of the combustion means, and a plurality of second flat tubes, which are lengthy in the flow direction of the combustion gas, are provided in a downstream side of the first flat tubes in the flow direction of the combustion gas, fins being formed on outer surfaces of said second flat tubes.

2. An absorption water heater/chiller as claimed in claim 1, wherein said fins are formed partly on flat portions of said second flat tubes.

3. An absorption water heater/chiller as claimed in claim 1, wherein a distance between said combustion means and said plurality of first flat tubes is 10 to 100 mm.

4. An absorption water heater/chiller as claimed in claim 1, wherein portions for receiving the absorption solution are formed on upper and lower portions of said inner cylinder between said inner cylinder and said outer cylinder, and said first flat tubes and said second flat tubes are communicated with the receiving portions.

5. An absorption water heater/chiller as claimed in claim 1, wherein the plurality of first flat tubes are arranged in two rows in the flow direction of the combustion gas.

6. A high temperature regenerator for absorption water heaters/chillers comprising:
    an inner cylinder;
    an outer cylinder which covers the inner cylinder;
    liquid chambers for holding a solution, and formed between the outer cylinder and the inner cylinder in upper and lower portions of the inner cylinder and;
    a burner mounted to said outer cylinder for burning a combustible gas in said inner cylinder; and
    a plurality of first solution tubes arranged in said inner cylinder to be communicated with said upper liquid chamber;
    wherein said burner has a flame hole plate toward the inner cylinder surface, and a distance between the flame hole plate and said first solution tubes is set to 10 mm to 100 mm.

7. A high temperature regenerator as claimed in claim 6, wherein a plurality of second solution tubes are arranged downstream of the first solution tubes to be communicated with said upper liquid chamber.

8. A high temperature regenerator as claimed in claim 7, wherein said second solution tubes are communicated with said lower liquid chamber.

9. A high temperature regenerator as claimed in claim 7, wherein a plurality of fins are formed on outer surfaces of said second solution tubes.

10. A high temperature regenerator as claimed in claim 9, wherein said second solution tubes are a flat tube, which is lengthy in the flow direction of the combustion gas.

11. A high temperature regenerator as claimed in claim 6, wherein said first solution tubes are a flat tube, which is lengthy in the flow direction of the combustion gas.

12. A high temperature regenerator as claimed in claim 6, wherein said first solution tubes are communicated with said lower liquid chamber.

13. A high temperature regenerator as claimed in claim 6, wherein said first solution tubes are constructed such that temperature boundary layers are formed to extend from the upstream side to the downstream side along the flow direction of the combustion gas.

* * * * *

UNITED STATES PATENT AND TRADEMARK OFFICE
CERTIFICATE OF CORRECTION

PATENT NO.    : 6,470,702 B2
DATED         : October 29, 2002
INVENTOR(S)   : Yasushi Funaba et al.

It is certified that error appears in the above-identified patent and that said Letters Patent is hereby corrected as shown below:

<u>Title page,</u>
Item [30], change the Foreign Application Priority Data, from
"Nov. 12, 1997 (JP)...9-310124" to -- Nov. 12, 1997 (JP)...9-310124 -- and
-- Nov. 11, 1998 (PCT)...PCT/JP98/05078 --.

Signed and Sealed this

Twenty-ninth Day of July, 2003

JAMES E. ROGAN
*Director of the United States Patent and Trademark Office*